(12) United States Patent
Komori et al.

(10) Patent No.: US 7,965,000 B2
(45) Date of Patent: Jun. 21, 2011

(54) VIBRATORY LINEAR ACTUATOR

(75) Inventors: Shunsuke Komori, Hikone (JP);
Masashi Moriguchi, Hikone (JP)

(73) Assignee: Panasonic Electric Works Co., Ltd.,
Osaka (JP)

( * ) Notice: Subject to any disclaimer, the term of this patent is extended or adjusted under 35 U.S.C. 154(b) by 0 days.

(21) Appl. No.: 12/385,769

(22) Filed: Apr. 20, 2009

(65) Prior Publication Data

US 2009/0267422 A1 Oct. 29, 2009

(30) Foreign Application Priority Data

Apr. 24, 2008 (JP) ................. 2008-114614

(51) Int. Cl.
*H02K 33/00* (2006.01)
(52) U.S. Cl. ............................ 310/15; 310/36
(58) Field of Classification Search .............. 310/14, 310/15, 17, 27, 36, 12.31, 12.33; 30/43.92, 30/43.93
See application file for complete search history.

(56) References Cited

U.S. PATENT DOCUMENTS

| | | | | |
|---|---|---|---|---|
| 5,632,087 | A * | 5/1997 | Motohashi et al. | 30/43.92 |
| 5,921,134 | A * | 7/1999 | Shiba et al. | 74/110 |
| 6,559,563 | B1 * | 5/2003 | Shimizu et al. | 310/12.19 |
| 6,958,554 | B2 * | 10/2005 | Fujiwara et al. | 310/36 |
| 6,991,217 | B2 * | 1/2006 | Shimizu et al. | 251/284 |
| 7,053,507 | B2 * | 5/2006 | Kobayashi et al. | 310/36 |
| 7,276,823 | B2 * | 10/2007 | Ichikawa et al. | 310/23 |
| 7,334,338 | B2 | 2/2008 | Shiba et al. | |
| 7,537,202 | B2 * | 5/2009 | Watanabe | 267/140.14 |
| 2004/0046461 | A1 * | 3/2004 | Shimizu et al. | 310/12 |

FOREIGN PATENT DOCUMENTS

| | | |
|---|---|---|
| JP | 8-322225 | 12/1996 |
| JP | 2004-154000 A | 5/2004 |
| JP | 2005-354879 | 12/2005 |
| JP | 2006-42897 A | 2/2006 |
| JP | 2006-300308 A | 11/2006 |
| JP | 2007-083073 | 4/2007 |

OTHER PUBLICATIONS

Office Action of corresponding Japanese application No. 2008-114614.
Office Action issued on Sep. 20, 2010 in corresponding Korean application No. 10-2009-0032800.
Office Action of corresponding Chinese application No. 2009 10136904.6.

* cited by examiner

*Primary Examiner* — Thanh Lam
(74) *Attorney, Agent, or Firm* — Bacon & Thomas, PLLC (57) ABSTRACT

A vibratory linear actuator includes a stator with a magnetic pole surface, a movable member with a magnetic pole surface, an electromagnet arranged in one of the stator and the movable member, a permanent magnet arranged in the other of the stator and the movable member and a support unit for movably supporting the movable member so that the magnetic pole surface of the electromagnet can oppose the magnetic pole surface with a gap left therebetween. The actuator is designed to vibrate the movable member by supplying an electric current to the electromagnet. The support unit includes a fixed portion to be fixed to a housing for accommodating the actuator, and the stator is configured to be fixed to the support unit as the support unit is fixed to the housing.

8 Claims, 13 Drawing Sheets

VIBRATORY LINEAR ACTUATOR

FIELD OF THE INVENTION

The present invention relates to a vibratory linear actuator that can be used as a driving power source of a reciprocating electric razor or the like.

BACKGROUND OF THE INVENTION

There is known a vibratory linear actuator that includes a stator, a plurality of movable members arranged in parallel, an electromagnet arranged in the stator, a plurality of permanent magnets arranged in the movable members, a support unit for movably supporting the movable members so that the magnetic pole surface of the electromagnet can oppose the magnetic pole surfaces of the permanent magnets with a gap left therebetween, the movable members being caused to vibrate by supplying an electric current to the electromagnet (see Japanese Patent Laid-open Publication No. 2005-354879).

In the vibratory linear actuator, the support unit and the plurality of movable members are connected to each other by thin elastic pieces and are molded into an integral body with a synthetic resin for the purpose of reduction in size. The support unit is divided into two support portions along the reciprocating vibration direction of the movable members. The stator is interposed between the two support portions for reduction in height dimension.

With the vibratory linear actuator, the electromagnet is arranged in the stator and the permanent magnets are arranged in the movable members. The movable members are reciprocatingly vibrated in opposite phases. Therefore, a torsional force is always applied to the support portions, which means that the actuator is susceptible to a change in the gap size between the permanent magnets and the electromagnet. In view of this, the synthetic resin-made base of the stator and the support portions are firmly coupled together by a plurality of screws in an effort to stabilize the gap size.

However, not only such a screw coupling structure is costly but also additional screws are needed to fix the vibratory linear actuator to the housing of an electric razor.

SUMMARY OF THE INVENTION

In view of the above, the present invention provides a vibratory linear actuator which is small in size and low in price.

In accordance with an aspect of the present invention, there is provided a vibratory linear actuator including:

a stator with a magnetic pole surface;

a movable member with a magnetic pole surface;

an electromagnet arranged in one of the stator and the movable member;

a permanent magnet arranged in the other of the stator and the movable member; and a support unit for movably supporting the movable member so that the magnetic pole surface of the electromagnet can oppose the magnetic pole surface with a gap left therebetween, the actuator being designed to vibrate the movable member by supplying an electric current to the electromagnet, wherein the support unit includes a fixed portion to be fixed to a housing for accommodating the actuator, the stator being configured to be fixed to the support unit as the support unit is fixed to the housing.

The stator may be fixed against removal between the support unit and the housing. Further the support unit may include an engaged portion and the stator may include an engaging portion brought into engagement with the engaged portion of the support unit and fixed in position by the engagement.

Preferably, the housing is shaped to ensure that the gap between the electromagnet and the permanent magnet can be seen from outside.

With the present invention, the support unit and the stator are fixed together as the support unit is assembled to the housing. Therefore, there is no need to use screws or other fixing means which would otherwise be needed to fix the stator and the support unit together. This reduces the number of component parts and the errors involved in assembling them. As a result, it is possible to save the cost and to stabilize the characteristics.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Hereinafter, the present invention will be described with reference to embodiments shown in the accompanying drawings.

Figure 1:
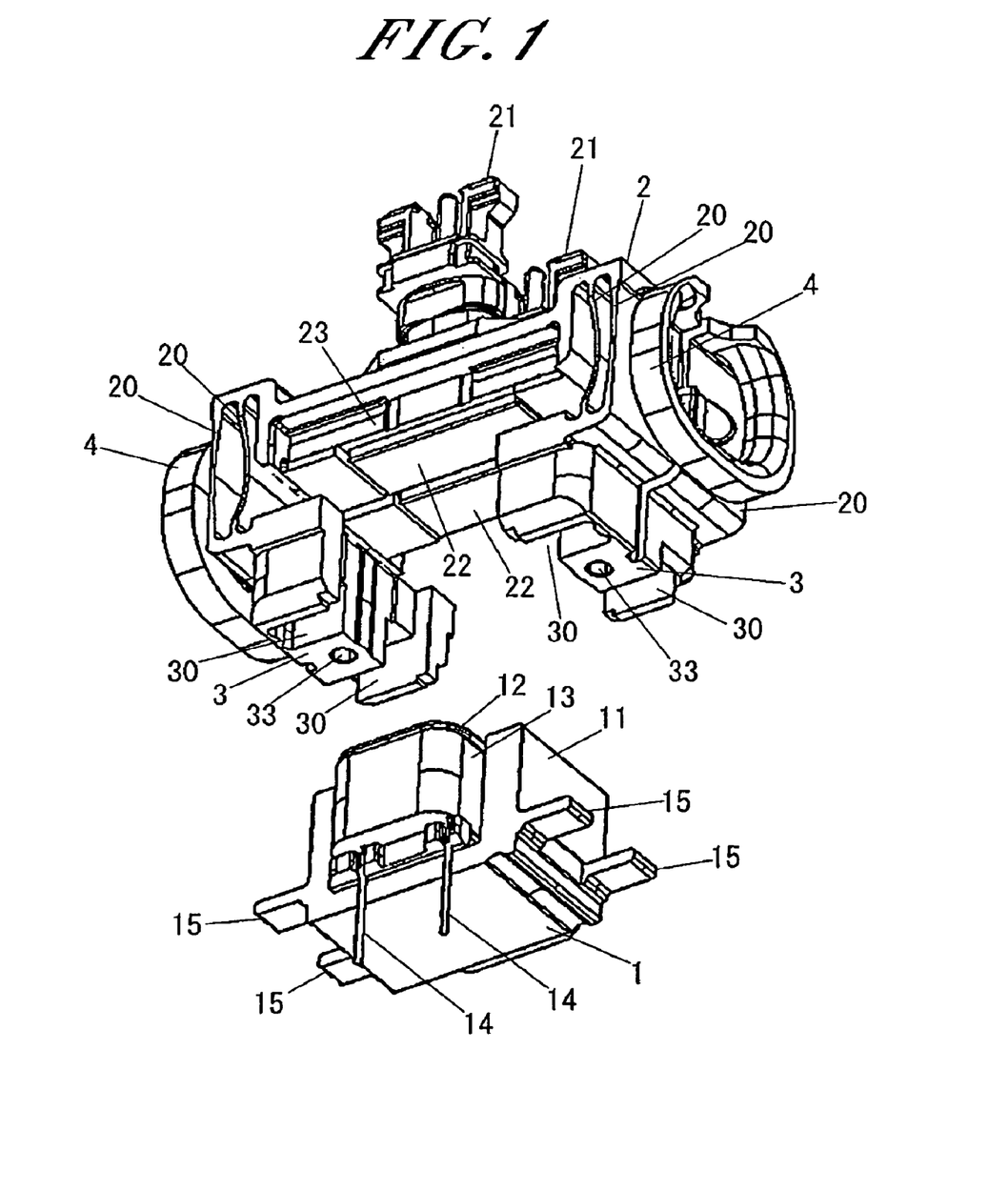
FIG. 1 is an exploded perspective view showing a vibratory linear actuator in accordance with one embodiment of the present invention.
Figure 2:
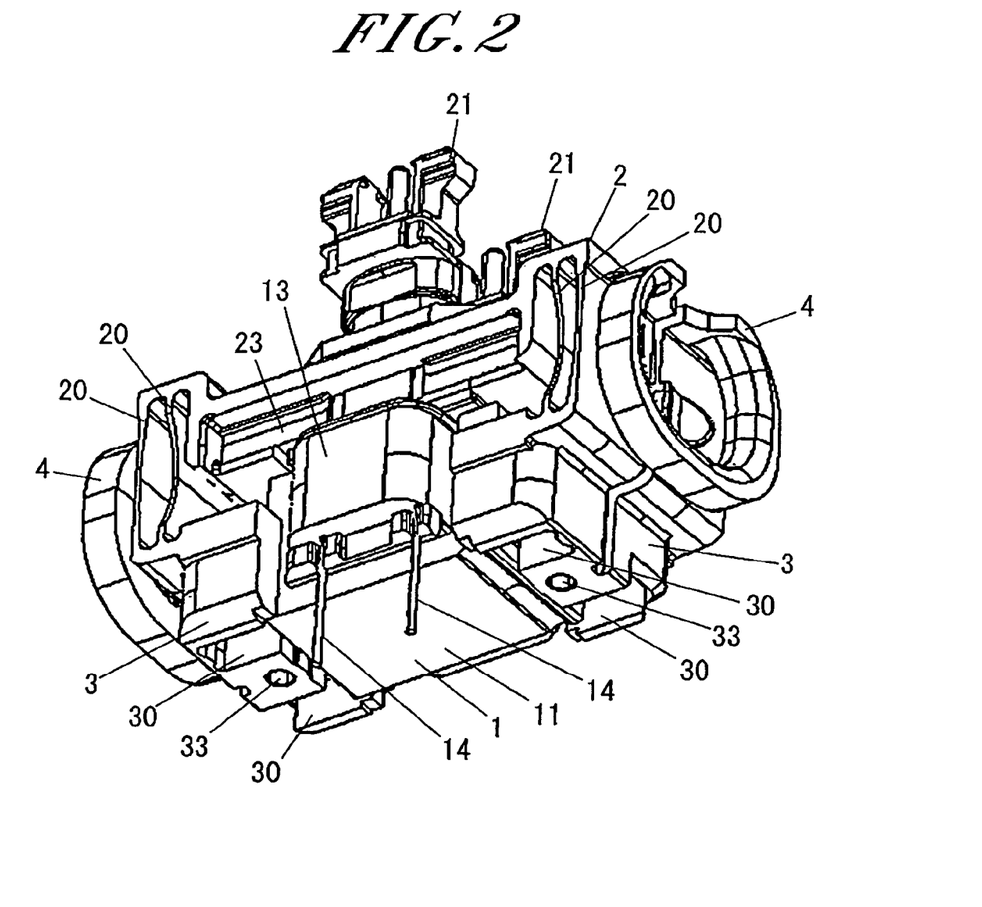
FIG. 2 is an assembled perspective view of the vibratory linear actuator shown in FIG. 1.

Referring to FIGS. 1 and 2, a vibratory linear actuator in accordance with one embodiment of the present invention includes a stator 1, two movable members 2 arranged in parallel, a first support unit 3 to which the movable members 2 are connected at their first ends through first thin elastic pieces 20, a second support unit 3 to which the movable members 2 are connected at their second ends through second thin elastic pieces 20, a first spring piece 4 for interconnecting the first ends of the movable members 2 and a second spring piece 4 for interconnecting the second ends of the movable members 2. The two movable members 2, the first and second support units 3, the first and second spring pieces 4 and the four elastic pieces 20 are formed into an integral body with a synthetic resin.

The vibratory linear actuator is used to drive a reciprocating-type electric razor and further includes driving members 21 provided on the upper surfaces of the movable members 2. Internal razor blades are carried by the driving members 21. Permanent magnets 22 and back yokes 23 are attached to the lower surfaces of the movable members 2.

The first and second elastic pieces 20 extend from the opposite ends of the movable members 2. The first and second support units 3 are arranged below the permanent magnets 22 in an opposing relationship with each other.

The stator 1 is an electromagnet including an "E"-shaped metallic core 11, a coil bobbin 12 and a winding 13 wound on a center piece of the core 11. The stator 1 is arranged between the support units 3 so that the tip magnetic pole surface of the core 11 can oppose the permanent magnets 22 with a gap left therebetween.

When an alternating current is supplied to the winding 13, the movable members 2 make reciprocating movement while bending the elastic pieces 20. The magnetic poles of the permanent magnets 22 are arranged to ensure that the movable members 2 can reciprocating movement in opposite phases. During this reciprocating movement, the spring pieces 4 form a spring vibration system in combination with the movable members 2. The movable members 2 are caused to make sympathetic vibration by driving the movable members 2 at a vibration frequency matching with the natural frequency of the spring vibration system.

As is apparent in FIG. 1, the core 11 includes a plurality of jut portions 15 protruding from the opposite ends thereof toward the first and second support units 3 along the vibration direction of the movable members 2. At each of the opposite ends of the core 11, the jut portions 15 are spaced apart from each other in a corresponding relationship with the movable members 2. The jut portions 15 serve as engaging portions inserted into and brought into engagement with recess-like engaged portions 30 provided on the lower surfaces of the support units 3. The stator 1 is attracted toward the movable members 2 by the magnetic attraction force acting between the core 11 and the permanent magnets 22 and is fixed in position as the jut portions 15 are brought into engagement with the engaged portions 30. At this time, a gap is defined between the tip magnetic pole surface of the core 11 and the permanent magnets 22.

Inasmuch as the movable members 2 are driven in opposite phases, torsional forces acting in a direction perpendicular to the vibration direction of the movable members 2 are applied to the support units 3. Nevertheless, the support units 3 are held against torsional deformation and the gap is kept in a constant size at all times, because the jut portions 15 are inserted into the engaged portions 30.

Figure 9:
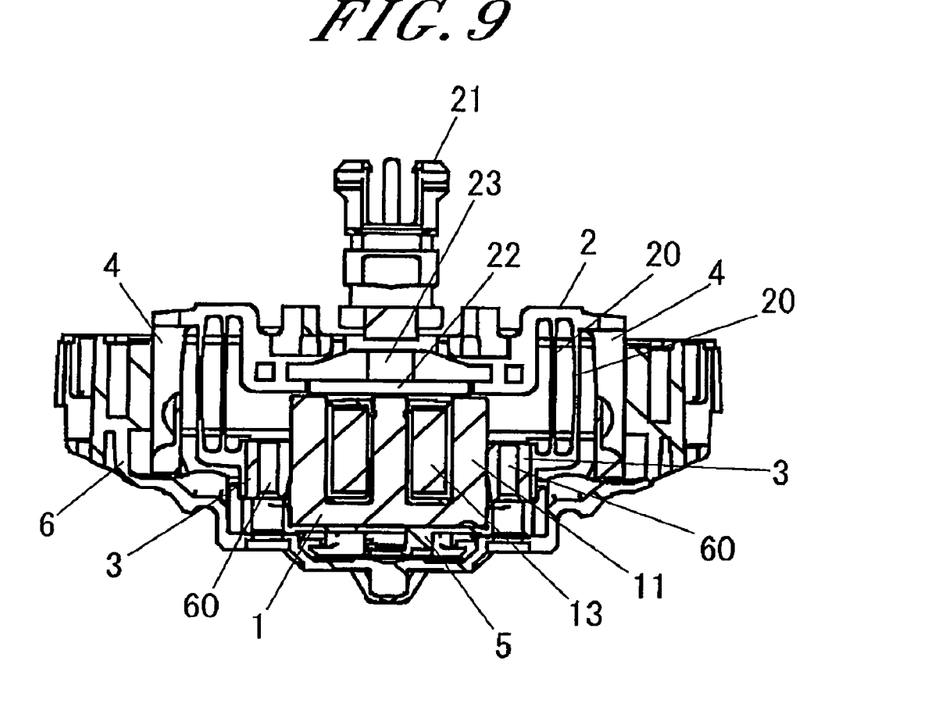
FIG. 9 is a front vertical section view of the vibratory linear actuator shown in FIG. 5, which is fixed to a housing.
Figure 10:
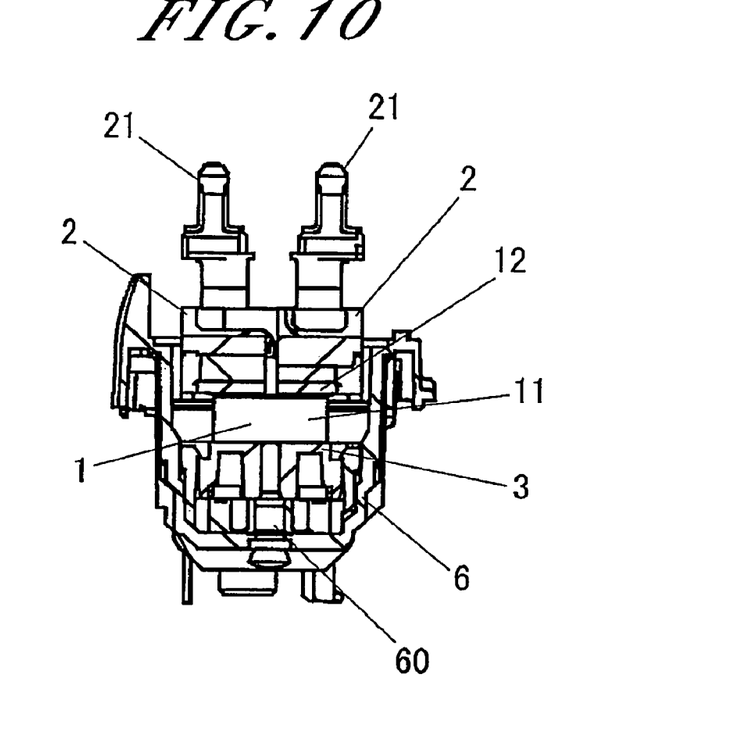
FIG. 10 is a side vertical section view of the vibratory linear actuator shown in FIG. 5, which is fixed to the housing.
Figure 11:
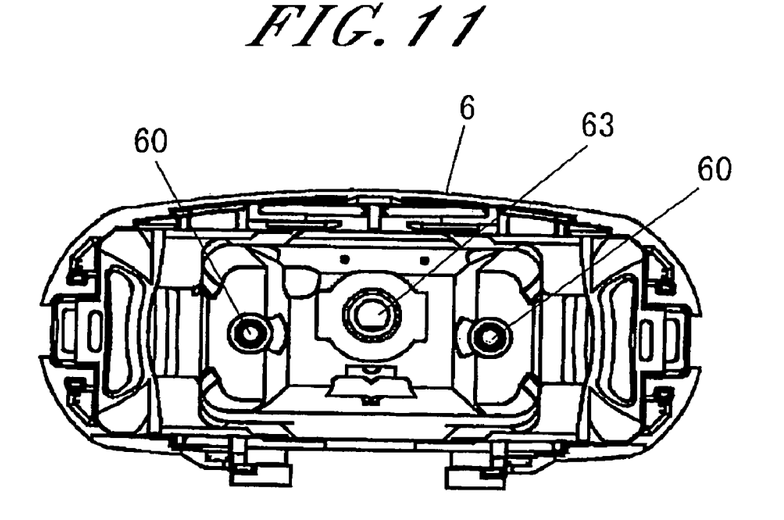
FIG. 11 is a bottom view of the vibratory linear actuator shown in FIG. 5, which is fixed to the housing.

Screw holes 33 are formed at the center areas of the support units 3 along the arrangement direction of the movable members 2. As can be seen in FIGS. 9 through 11, screws 60 are threadedly driven into the screw holes 33 to fix the vibratory linear actuator to a housing 6 of an electric razor.

The screws 60 serve not only to fix the support units 3 to the housing 6 but also to hold the stator 1 against removal in between the support units 3 and the housing 6, eventually fixing the support units 3 and the stator 1 in place. The assembling process of the vibratory linear actuator is finalized by assembling the same on the housing 6.

Figure 3:
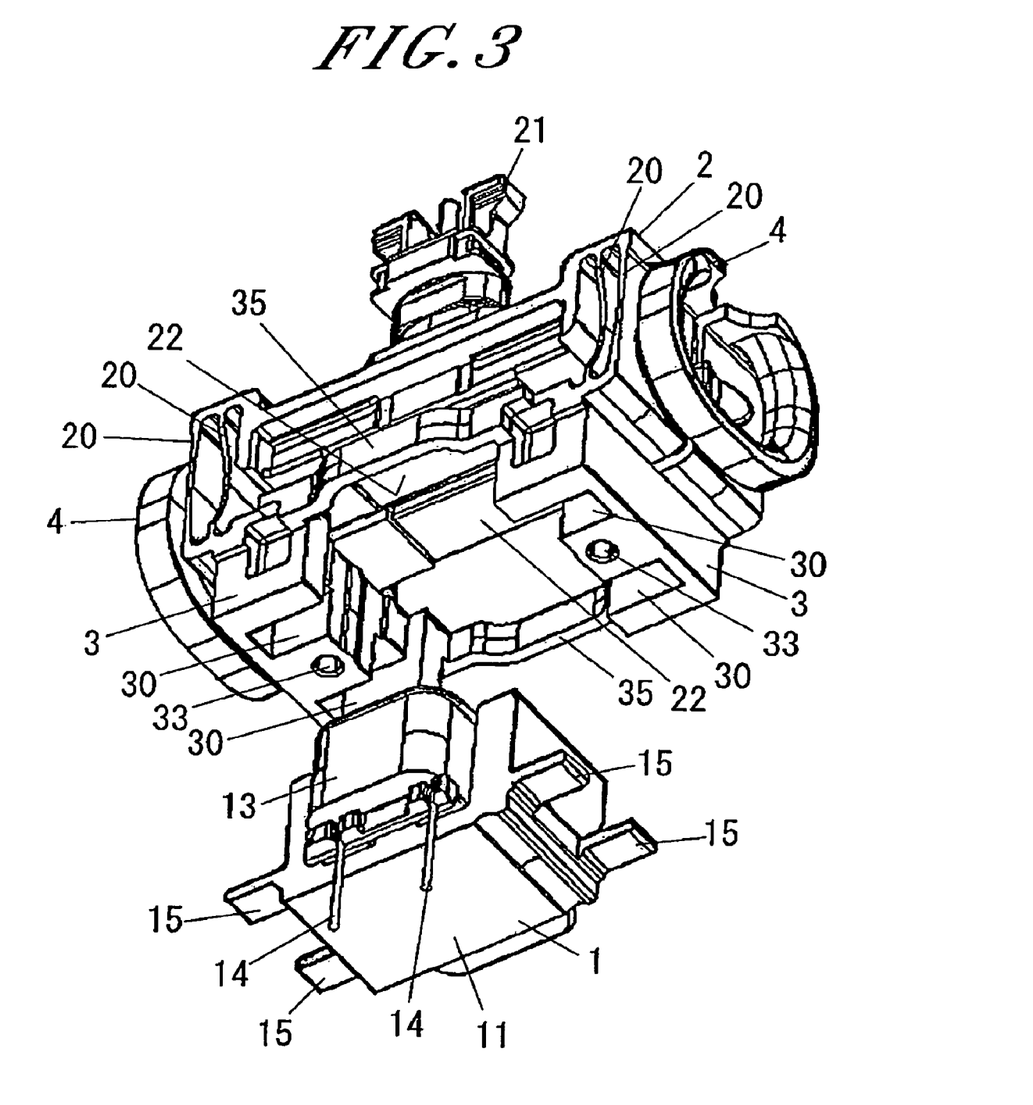
FIG. 3 is an exploded perspective view showing a vibratory linear actuator in accordance with another embodiment of the present invention.
Figure 4:
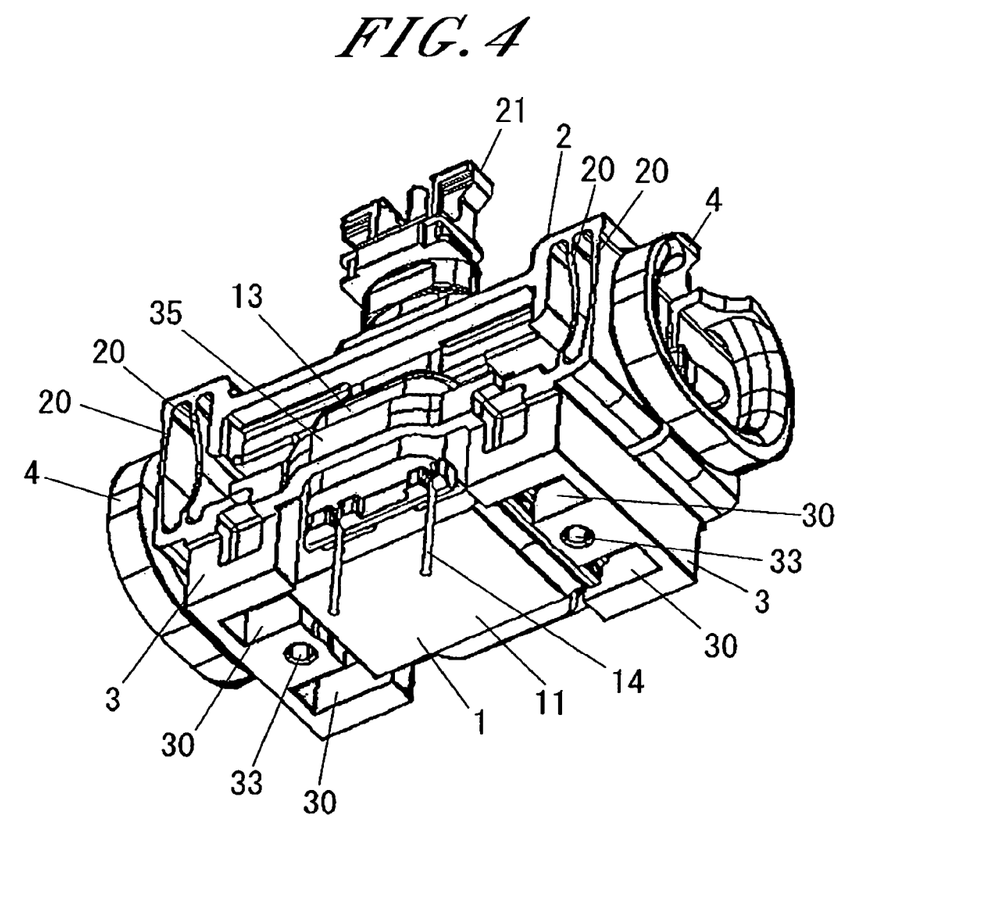
FIG. 4 is an assembled perspective view of the vibratory linear actuator shown in FIG. 3.
Figure 5:
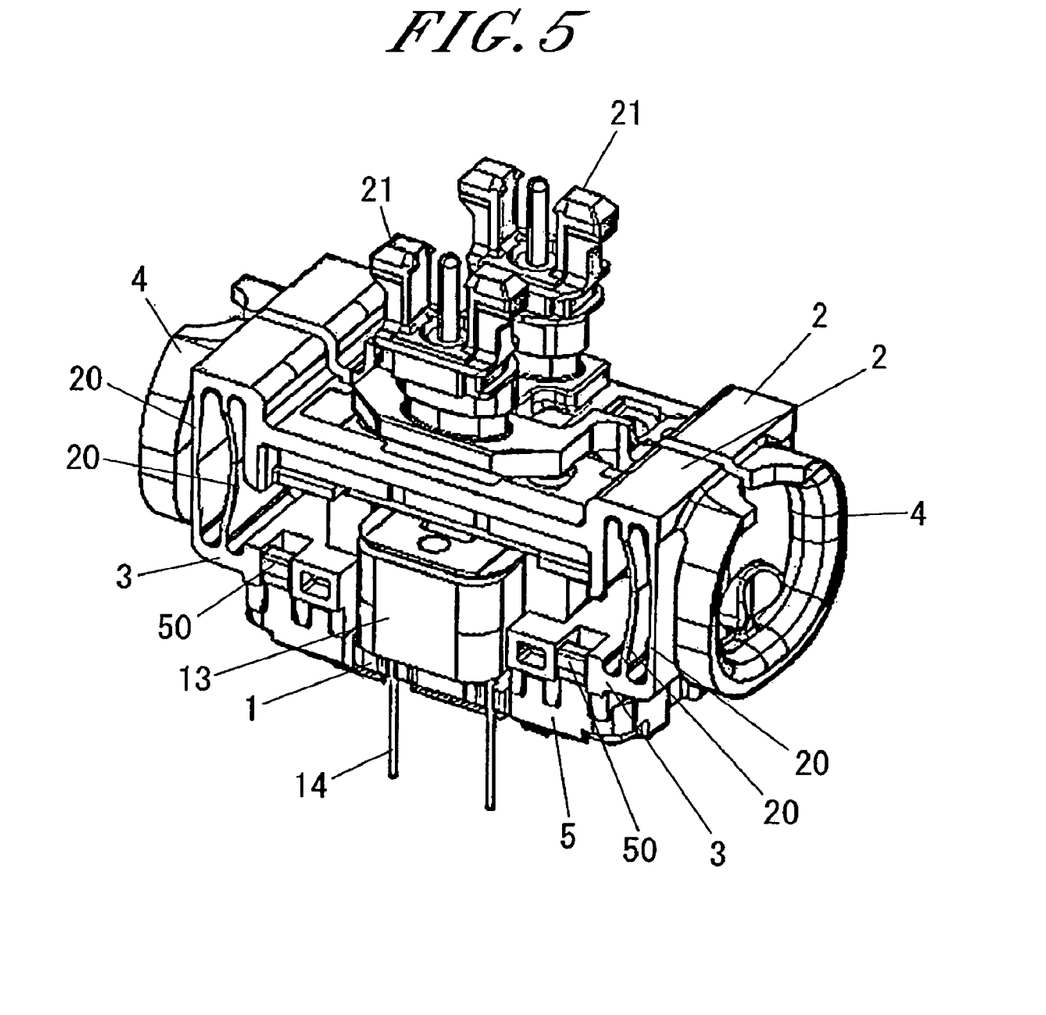
FIG. 5 is an assembled perspective view showing a vibratory linear actuator in accordance with a further embodiment of the present invention.
Figure 6:
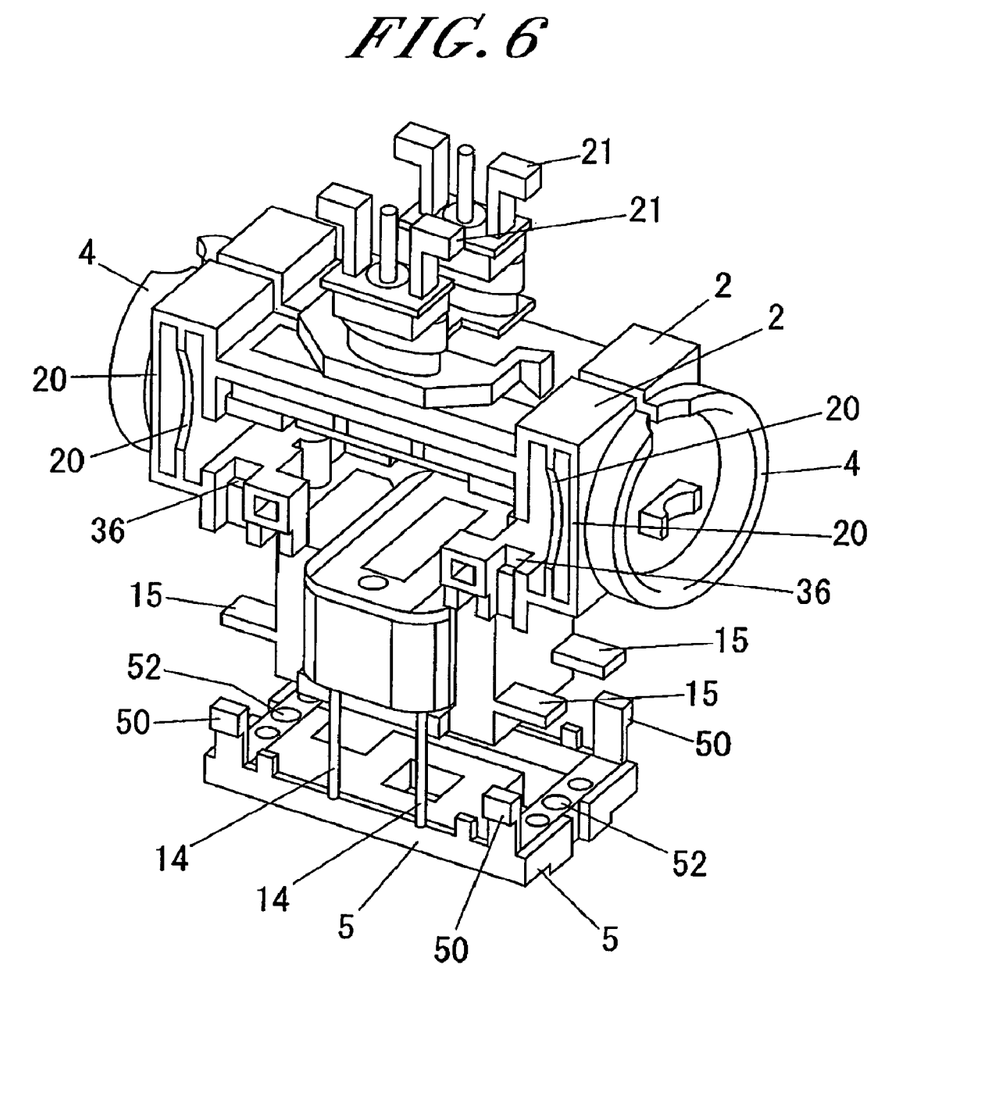
FIG. 6 is an exploded perspective view of the vibratory linear actuator shown in FIG. 5.

FIGS. 3 and 4 show a vibratory linear actuator in accordance with another embodiment of the present invention. This actuator has essentially the same configuration as that of the actuator of the preceding embodiment. In this embodiment, the actuator further includes bridges 35 integrally formed with the support units 3 for interconnecting the support units 3 spaced apart in the vibration direction of the movable members 2. Presence of the bridges 35 increases the resistance of the support units 3 against the torsional forces applied thereto. This makes it possible for the actuator to enjoy enhanced characteristics.

FIGS. 5 through 8 show a vibratory linear actuator in accordance with a further embodiment of the present invention. In this embodiment, a cover 5 for arranging the power-supplying lead lines (not shown) leading to a pair of coil terminals 14 to which the windings 13 of the stator 1 are connected is attached to the stator 1 and the lower surfaces of the support units 3. The cover 5 is made of a synthetic resin and is provided with a plurality of hooks 50 at its outer periphery. The hooks 50 are locked into engagement recesses 36 so that the cover 5 can cover the lower surfaces of the stator 1 and the support units 3.

Figure 7:
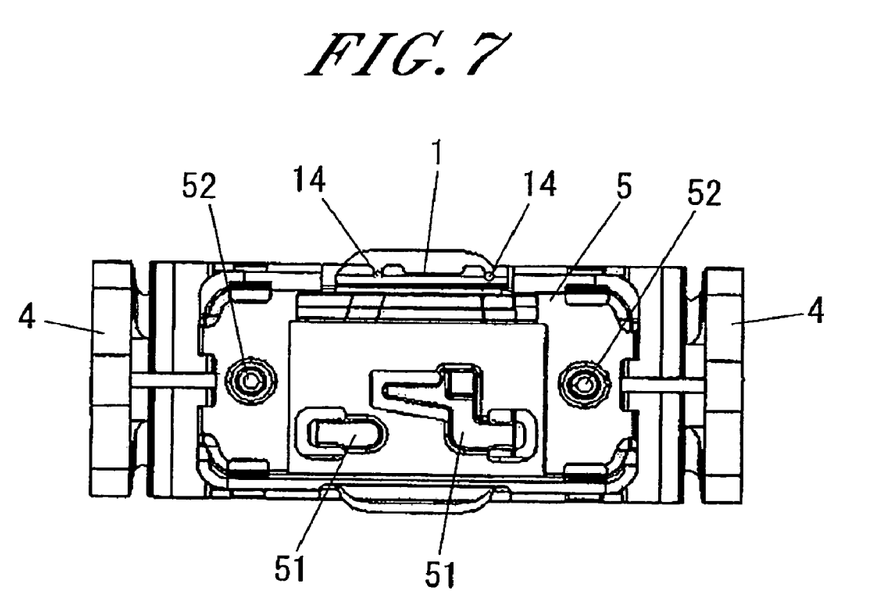
FIG. 7 is a bottom view of the vibratory linear actuator shown in FIG. 5.
Figure 8:
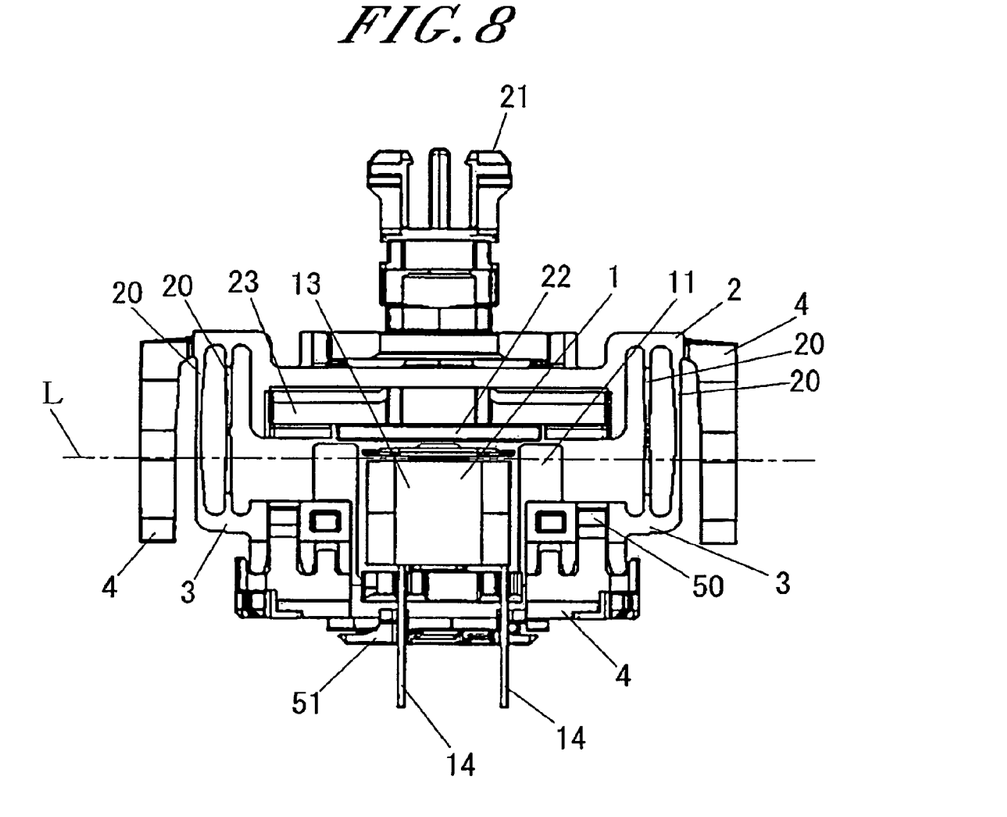
FIG. 8 is a front view of the vibratory linear actuator shown in FIG. 5.

As shown in FIG. 7, the cover 5 includes wiring arrangement portions 51 for hooking and arranging the lead lines on its lower surface and through-holes 52 through which the screws 60 for fixing the actuator to the housing 6 is inserted. FIGS. 9 through 11 show the vibratory linear actuator provided with the cover 5.

Figure 12:
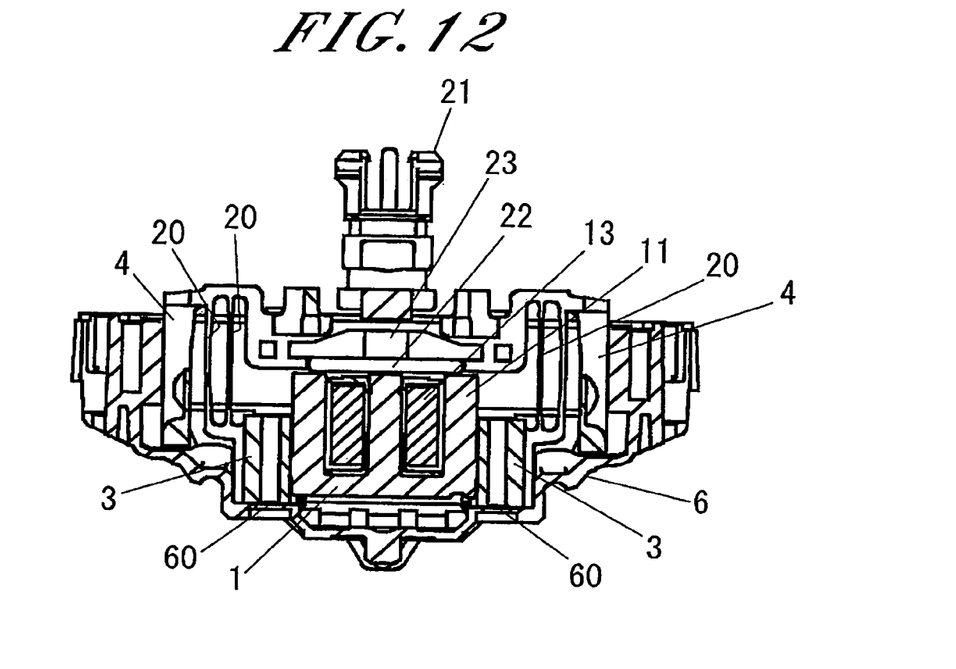
FIG. 12 is a front vertical section view showing a vibratory linear actuator in accordance with a still further embodiment of the present invention.

FIG. 12 shows a vibratory linear actuator in accordance with a still further embodiment of the present invention. This actuator is not provided with the cover 5 and is fixed to the housing 6 by means of the screws 60.

Figure 13:
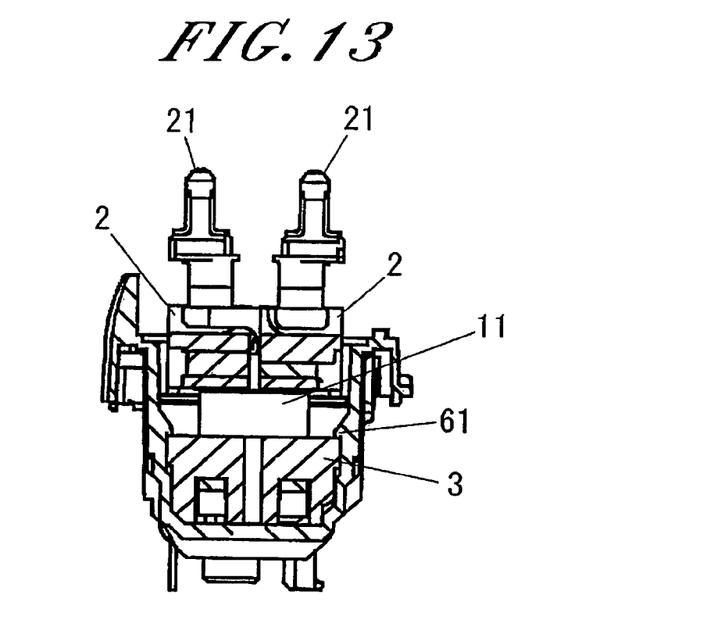
FIG. 13 is a side vertical section view showing a vibratory linear actuator in accordance with a yet still further embodiment of the present invention.

The vibratory linear actuator may be fixed to the housing 6 by a fixing means other than the screws 60. For example, as shown in FIG. 13, fastener hooks 61 are formed on the inner surface of the housing 6 and are locked against the upper edge of the support units 3 fitted into the housing 6, thereby fixing the support units 3 and the stator 1, namely the vibratory linear actuator, to the housing 6.

Figure 14:
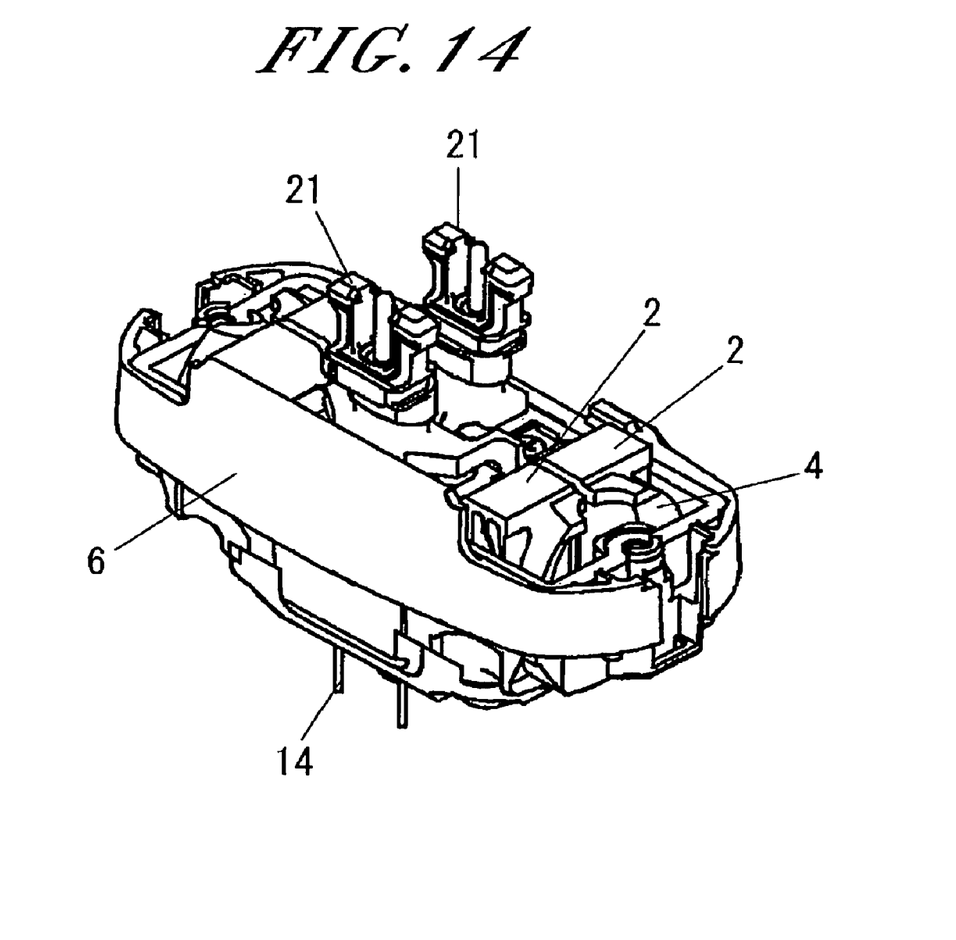
FIG. 14 is a perspective view of the vibratory linear actuator shown in FIG. 13.

As shown in FIG. 14, the housing 6 is configured to surround the vibratory linear actuator and is coupled to the main body (not shown) of an electric razor serving as a grip portion. A blade frame for holding an external razor blade is connected to the upper surface of the housing 6. Referring back to FIG. 11, a hole 63 through which to pass the lead lines is formed on the lower surface of the housing 6.

Since the assembling process of the vibratory linear actuator is finalized by assembling the same on the housing 6, it is impossible to perform accurate examination of the characteristics unless the actuator is fixed to the housing 6. In this regard, if the height of at least a portion of the housing 6 is set so as to make the gap between the stator 1 and the permanent magnets 22 visible from the outside as indicated by a chain line L in FIG. 8, it becomes possible to see the gap size with naked eyes, which makes it easy to perform examination or other tasks.

Although the electromagnet is arranged in the stator 1 and the permanent magnets 22 are arranged in the movable members 2 in the foregoing embodiments, the present invention can apply to a case where a permanent magnet is arranged in the stator 1 and electromagnets are arranged in the movable members 2. In view of strength and rigidity, it is preferred that protrusion portions 15 as engagement portions are formed in the back yoke 23 arranged at the rear of the permanent magnet of the stator 1.

Figure 15:
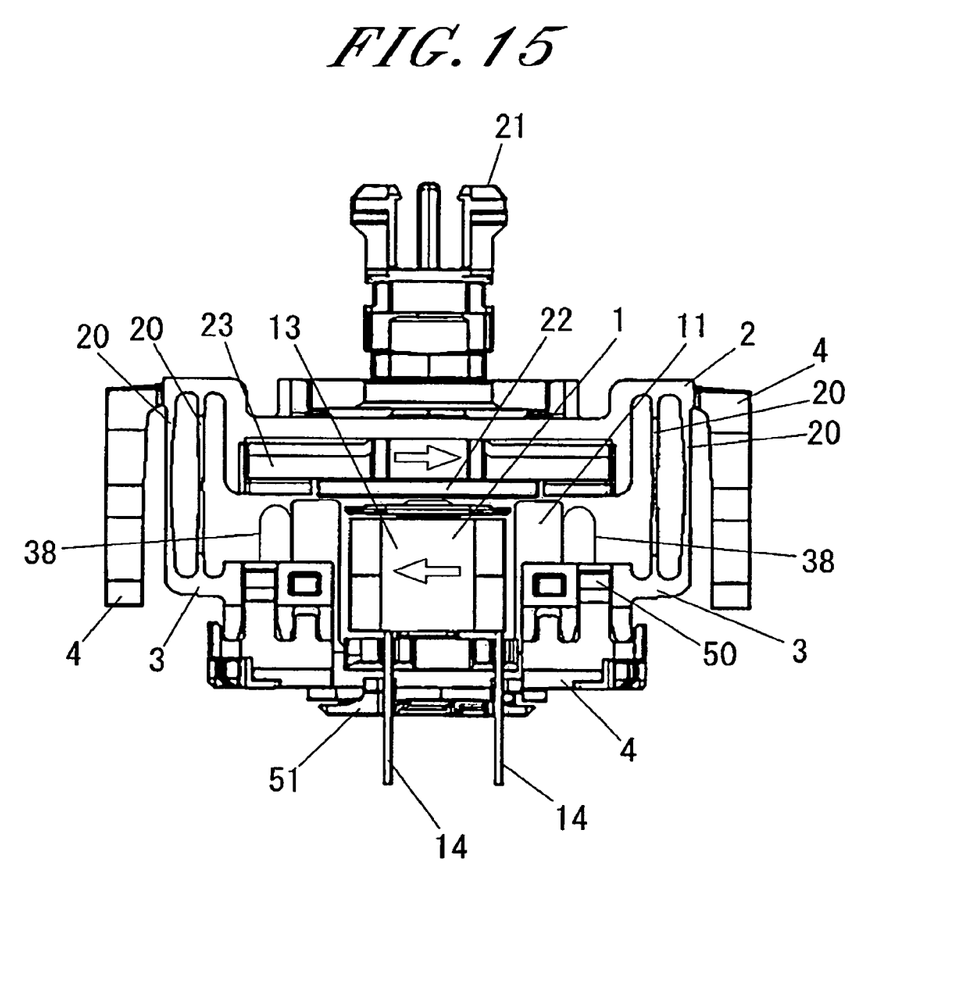
FIG. 15 is a front view showing a vibratory linear actuator in accordance with a reference example.

Although the stator 1 is connected and fixed to the support units 3 in the foregoing embodiments, the stator 1 and the support units 3 may be connected to each other by resilient pieces 38 and driven in the left-and-right direction as shown in FIG. 15. When a single movable member 2 is caused to reciprocatingly vibrate or when a plurality of movable members 2 is caused to reciprocatingly vibrate in the same phase, the stator 1 and the movable member(s) 2 may be allowed to vibrate in opposite phases.

While the invention has been shown and described with respect to the embodiments, it will be understood by those skilled in the art that various changes and modification may be made without departing from the scope of the invention as defined in the following claims.

What is claimed is:

1. A vibratory linear actuator comprising:
   a stator with a magnetic pole surface;
   a movable member with a magnetic pole surface;
   an electromagnet arranged in one of the stator and the movable member;
   a permanent magnet arranged in the other of the stator and the movable member; and
   a support unit for movably supporting the movable member so that the magnetic pole surface of the electromagnet opposes the magnetic pole surface with a gap left therebetween, the actuator being designed to vibrate the movable member by supplying an electric current to the electromagnet,
   wherein the support unit includes a fixed portion to be fixed to a housing for accommodating the actuator, the stator being configured to be fixed to the support unit as the support unit is fixed to the housing.

2. The vibratory linear actuator of claim 1, wherein the stator is fixed against removal between the support unit and the housing.

3. The vibratory linear actuator of claim 1, wherein the support unit includes an engaged portion and the stator includes an engaging portion brought into engagement with the engaged portion of the support unit and fixed in position by the engagement.

4. The vibratory linear actuator of claim 2, wherein the support unit includes an engaged portion and the stator includes an engaging portion brought into engagement with the engaged portion of the support unit and fixed in position by the engagement.

5. The vibratory linear actuator of claim 1, wherein the housing is shaped to ensure that the gap between the electromagnet and the permanent magnet is visible from outside.

6. The vibratory linear actuator of claim 2, wherein the housing is shaped to ensure that the gap between the electromagnet and the permanent magnet is visible from outside.

7. The vibratory linear actuator of claim 3, wherein the housing is shaped to ensure that the gap between the electromagnet and the permanent magnet is visible from outside.

8. The vibratory linear actuator of claim 4, wherein the housing is shaped to ensure that the gap between the electromagnet and the permanent magnet is visible from outside.

* * * * *